United States Patent
Nandeda et al.

(10) Patent No.: US 11,995,588 B1
(45) Date of Patent: May 28, 2024

(54) FAIR SHARE BAND OPTIMIZATION USING GAUSSIAN BAYESIAN NETWORK

(71) Applicant: Blue Yonder Group, Inc., Scottsdale, AZ (US)

(72) Inventors: Narayan Nandeda, Ujjain (IN); Phani Bulusu, Bangalore (IN); Rashid Puthiyapurayil, Bangalore (IN); Tushar Shekhar, Bangalore (IN); Vidhi Chugh, Bangalore (IN); Vishal Shinde, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 22 days.

(21) Appl. No.: 17/373,466

(22) Filed: Jul. 12, 2021

Related U.S. Application Data

(60) Provisional application No. 63/052,618, filed on Jul. 16, 2020, provisional application No. 63/051,647, filed on Jul. 14, 2020.

(51) Int. Cl.
*G06Q 10/00* (2023.01)
*G06Q 10/04* (2023.01)
*G06Q 10/0631* (2023.01)

(52) U.S. Cl.
CPC ....... *G06Q 10/06315* (2013.01); *G06Q 10/04* (2013.01)

(58) Field of Classification Search
None
See application file for complete search history.

(56) References Cited

U.S. PATENT DOCUMENTS

| | | | |
|---|---|---|---|
| 7,672,862 B1* | 3/2010 | Venkatasubramanyan | ................... G06Q 10/08 705/7.22 |
| 2006/0155593 A1* | 7/2006 | Kasper | ................... G06Q 10/04 705/7.29 |
| 2007/0038657 A1* | 2/2007 | Denton | ................... G06Q 10/04 |
| 2010/0262520 A1* | 10/2010 | Najmi | ............... G06Q 10/06315 705/28 |

(Continued)

OTHER PUBLICATIONS

Satyajith Amaran, Nikolaos V. Sahinidis, Bikram Sharda, Scott J. Bury et al. "Simulation optimization: a review of algorithms and applications," Ann Oper Res (2016) 240:351-380). (Year: 2016).*

(Continued)

*Primary Examiner* — Hafiz A Kassim
(74) *Attorney, Agent, or Firm* — Spencer Fane LLP; Steven J. Laureanti

(57) ABSTRACT

A system and method for efficiently determining the fair-share bands of a supply chain planning problem modeled as a multi-objective hierarchical linear programming problem include a processor and memory and are configured to model a supply chain planning problem as a multi-objective hierarchal linear programming problem, assign weights at each band of a fixed number of at least two bands, determine a direction of improved band values from a value of a Key Process Indicator (KPI) calculated from an expected demand and short quantities, wherein the expected demand and short quantities are calculated from the multi-objective hierarchical linear programming problem using a sample generated by Gibbs sampling of a conditional Gaussian Bayesian Network, and generate a supply chain plan.

20 Claims, 5 Drawing Sheets

(56) References Cited

U.S. PATENT DOCUMENTS

2016/0210683 A1* 7/2016 Aqlan ................ G06Q 30/0635
2017/0185933 A1* 6/2017 Adulyasak ........... G06Q 10/087
2017/0364847 A1* 12/2017 Kamath ............. G06Q 10/0633
2019/0378066 A1* 12/2019 Zhu .................... G06Q 30/0201

OTHER PUBLICATIONS

Joseph Sarkis, Dileep G. Dhavale et al. "Supplier selection for sustainable operations: A triple-bottom-line approach using a Bayesian framework," Int. J. Production Economics 166 (2015) 177-191). (Year: 2015).*

28. S.A. Torabia, E. Hassinib et al. "An interactive possibilistic programming approach for multiple objective supply chain master planning," ScienceDirect-Fuzzy Sets and Systems 159 (2008) 193-214. (Year: 2008).*

\* cited by examiner

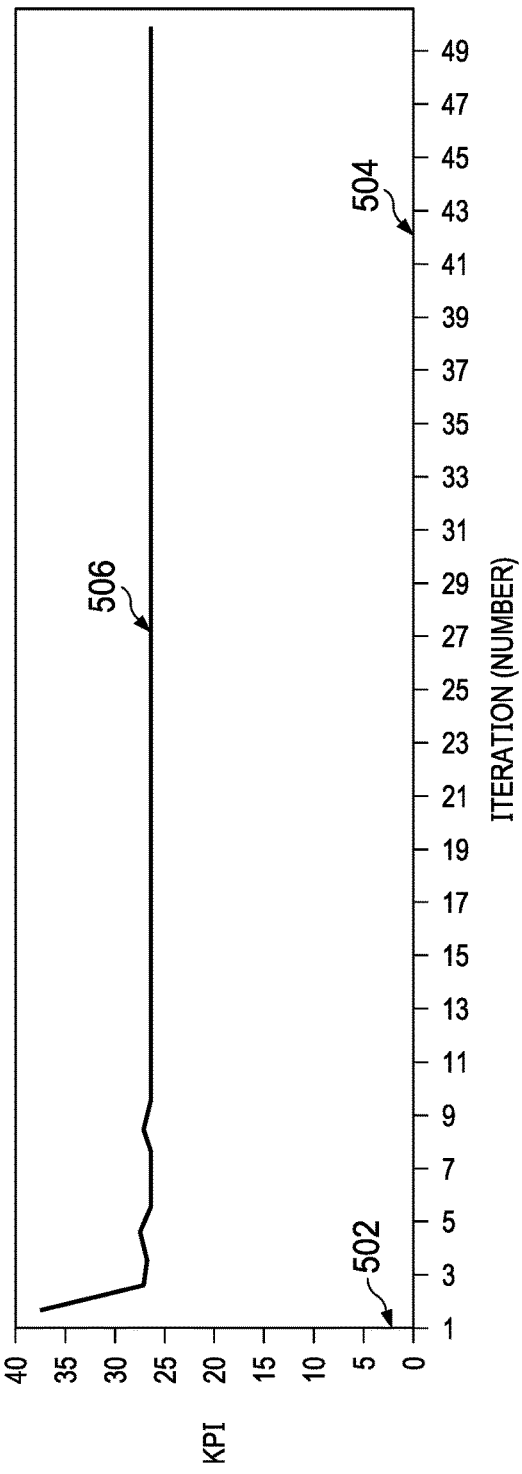
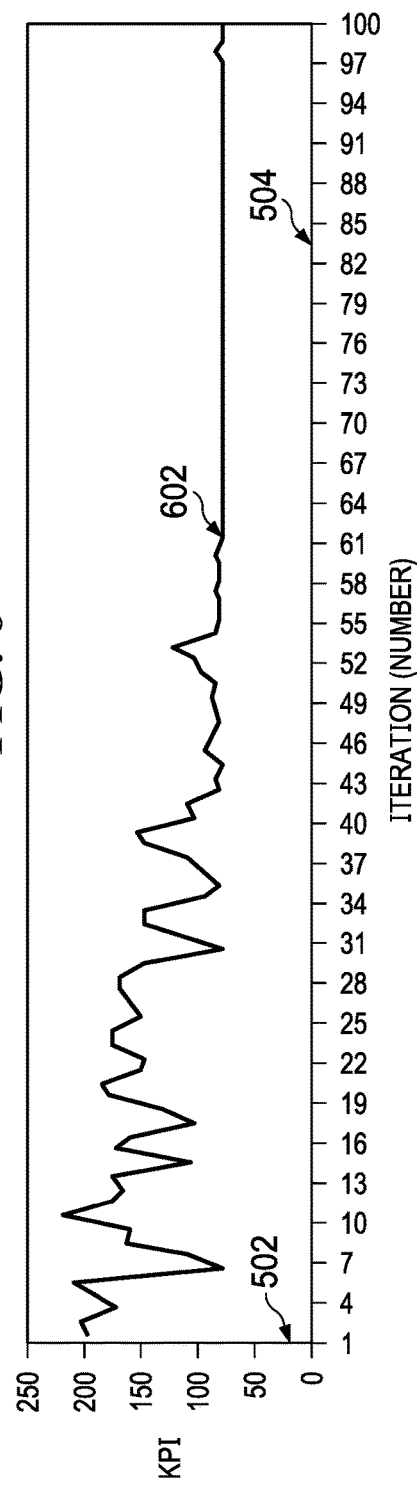

FAIR SHARE BAND OPTIMIZATION USING GAUSSIAN BAYESIAN NETWORK

CROSS-REFERENCE TO RELATED APPLICATIONS

The present disclosure is related to that disclosed in the U.S. Provisional Application No. 63/052,618, Jul. 16, 2020, entitled "Fair Share Band Optimization Using Gaussian Bayesian Network" and U.S. Provisional Application No. 63/051,647, filed Jul. 14, 2020, entitled "Fair-Share Band Optimization Using Mixture of Heterogeneous Gaussian." U.S. Provisional Application Nos. 63/052,618 and 63/051,647 are assigned to the assignee of the present application. The present invention hereby claims priority under 35 U.S.C. § 119(e) to U.S. Provisional Application Nos. 63/052,618 and 63/051,647.

TECHNICAL FIELD

The present disclosure relates generally to supply chain planning and specifically to solving supply chain planning problems modeled as multi-objective hierarchical linear programming problems with fair-share bands.

BACKGROUND

During supply chain planning, it is common for the demand requirement to exceed the available supply, often due to various capacity, material, or other constraints. In these instances, the limited supply may get distributed to demands in an unfair manner such that some demands are fully met, while others are fully unmet. To address the inequitable distribution of supply, a planner may use a trial-and-error approach to tune how the available supply is distributed across different demands. This requires the planner to calculate a supply chain plan to test each distribution and evaluate the fairness of the met demands, which is a time-consuming process that is not guaranteed to share demands in a way that best achieves the planning objectives. This approach is time-consuming and cannot determine the best arrangement for sharing limited supply, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIGS. 5-6 illustrate charts of convergence plots of calculated KPI at each iteration of band optimization, in accordance with an embodiment.

DETAILED DESCRIPTION

Figure 1:
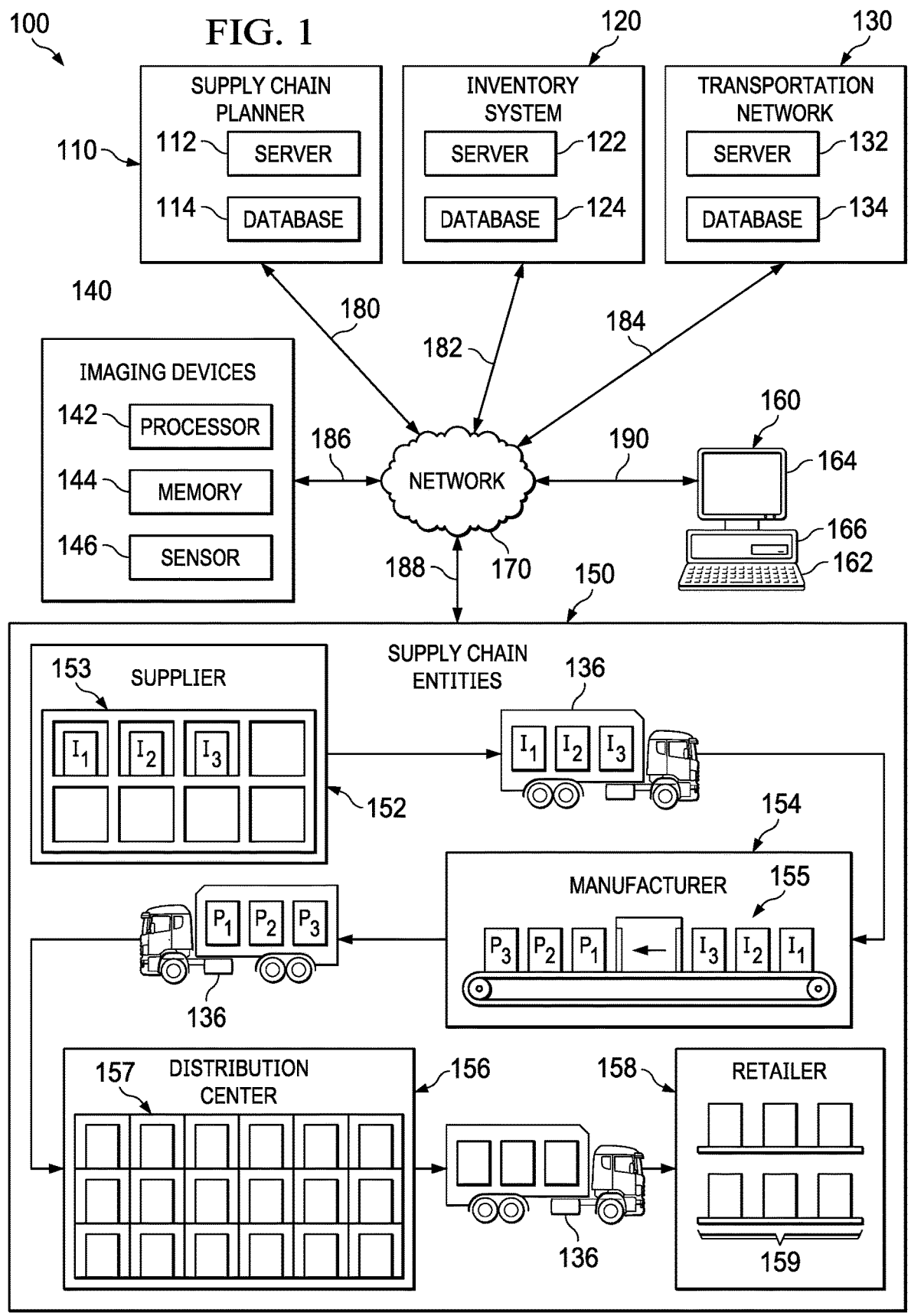
FIG. 1 illustrates an exemplary supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices, and technologies to which the disclosed inventions may be applied. The full scope of the inventions is not limited to the examples that are described below.

FIG. 1 illustrates exemplary supply chain network 100, in accordance with a first embodiment. Supply chain network 100 comprises supply chain planner 110, inventory system 120, transportation network 130, one or more imaging devices 140, one or more supply chain entities 150, computer 160, network 170, and communication links 180-190. Although a single supply chain planner 110, a single inventory system 120, a single transportation network 130, one or more imaging devices 140, one or more supply chain entities 150, a single computer 160, a single network 170, and one or more communication links 180-190 are shown and described, embodiments contemplate any number of supply chain planners, inventory systems, transportation network, imaging devices, supply chain entities, computers, networks, and communication links, according to particular needs.

In one embodiment, supply chain planner 110 comprises server 112 and database 114. Server 112 comprises one or more modules that model, generate, and solve a supply chain planning formulated as a single- or multi-objective linear programming problem (LPP) to produce a supply chain plan. For example, supply chain planner 110 may model a master production problem as a multi-objective hierarchical LPP and solve the LPP to generate a supply chain master plan. However, when the available supply is insufficient to meet demands, safety stock, or other requirements, supply chain planner 110 may generate layers and bands to share the limited supply in a fairer manner based on one or more customer requirements or business objectives. As described in further detail below, solver 204 (see FIG. 2) of supply chain planner 110 creates hierarchical objectives in one or more layers that attempt to distribute the limited supply more fairly in the resulting solution. Supply chain planner 110 may compute the number and value of the bands in each layer which produce a fair-shared plan. After solving for each of the multiple objectives (representing one or more fair-shared demands), the final mathematical solution of the multi-objective hierarchical LPP is converted to a corresponding supply chain plan, having fair-shared demands. Initially, a supply chain planning problem may be converted into a multi-objective LPP by mapping the mathematical constraints, objectives, and bounds on variables of the supply chain planning problem to mathematical expressions of the multi-objective LPP. After solving the LPP, supply chain planner 110 uses the mapping of supply chain planning problem to the multi-objective LPP to translate the solution of the multi-objective LPP to a supply chain plan.

Inventory system 120 comprises server 122 and database 124. Server 122 of inventory system 120 is configured to receive and transmit item data, including item identifiers, pricing data, attribute data, inventory levels, and other like data about one or more items at one or more locations in supply chain network 100. Server 122 stores and retrieves item data from database 124 or one or more locations in supply chain network 100.

Transportation network 130 comprises server 132 and database 134. According to embodiments, transportation network 130 directs one or more transportation vehicles 136 to ship one or more items between one or more supply chain entities 150 based, at least in part, on a supply chain plan or a re-allocation of materials or capacity determined by supply chain planner 110. In addition, the number of items shipped by one or more transportation vehicles 136 in transportation network 130 may also be based, at least in part, on the number of items currently in stock at one or more stocking locations of one or more supply chain entities 150, the number of items currently in transit, a forecasted demand, a supply chain disruption, and the like. One or more transportation vehicles 136 comprise, for example, any number of trucks, cars, vans, boats, airplanes, unmanned aerial vehicles (UAVs), cranes, robotic machinery, or the like. According to embodiments, one or more transportation vehicles 136 may be associated with one or more supply chain entities 150 and may be directed by automated navigation including, for example, GPS guidance, according to particular needs.

One or more imaging devices 140 comprise one or more processors 142, memory 144, one or more sensors 146, and may include any suitable input device, output device, fixed or removable computer-readable storage media, or the like. According to one embodiment, one or more imaging devices 140 comprise one or more electronic devices that may receive imaging information from one or more sensors 146 or from one or more databases in supply chain network 100. One or more imaging devices 140 may identify items near one or more sensors 146 and generate a mapping of the item in supply chain network 100. As explained in more detail below, transportation network 130 and/or one or more supply chain entities 150 use the mapping of an item to locate the item in supply chain network 100. The location of the item is then used to coordinate the storage and transportation of items in supply chain network 100 according to one or more plans generated by supply chain planner 110 and/or a reallocation of materials or capacity determined by solver 204. Plans may comprise one or more of a master supply chain plan, production plan, distribution plan, and the like and may include one or more fair-shared items or resources.

One or more imaging devices 140 may comprise a mobile handheld device such as, for example, a smartphone, a tablet computer, a wireless device, or the like. In addition, or as an alternative, one or more imaging devices 140 comprise one or more networked electronic devices configured to transmit item identity information to one or more databases as an item passes by or is scanned by one or more sensors 146. This may include, for example, a stationary scanner located at transportation network 130 or one or more supply chain entities 150 and which identifies items as the items pass near the scanner, including, for example, in one or more transportation vehicles 136. One or more sensors 146 of one or more imaging devices 140 may comprise an imaging sensor, such as, for example, a camera, scanner, electronic eye, photodiode, charged coupled device (CCD), or any sensor that detects images, such as, for example, product images, labels, barcodes, or the like. In addition, or as an alternative, one or more sensors 146 may comprise a radio receiver and/or transmitter configured to read an electronic tag coupled with a product, such as, for example, an RFID tag.

As shown in FIG. 1, supply chain network 100 comprising supply chain planner 110, inventory system 120, transportation network 130, one or more imaging devices 140, and one or more supply chain entities 150 may operate on one or more computers 160 that are integral to or separate from the hardware and/or software that support supply chain planner 110, inventory system 120, transportation network 130, one or more imaging devices 140, and one or more supply chain entities 150. Computers 160 may include any suitable input device 162, such as a keypad, mouse, touch screen, microphone, or other device to input information. Output device 164 may convey information associated with the operation of supply chain network 100, including digital or analog data, visual information, or audio information.

Computer 160 may include fixed or removable computer-readable storage media, including a non-transitory computer readable medium, magnetic computer disks, flash drives, CD-ROM, in-memory device, or other suitable media to receive output from and provide input to supply chain network 100. Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

Supply chain planner 110, inventory system 120, transportation network 130, one or more imaging devices 140, and one or more supply chain entities 150 may each operate on one or more separate computers 160, a network of one or more separate or collective computers 160, or may operate on one or more shared computers 160. In addition, supply chain network 100 may comprise a cloud-based computing system having processing and storage devices at one or more locations, local to, or remote from supply chain planner 110, inventory system 120, transportation network 130, one or more imaging devices 140, and one or more supply chain entities 150. In addition, each of one or more computers 160 may be a workstation, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with supply chain planner 110, inventory system 120, transportation network 130, one or more imaging devices 140, and one or more supply chain entities 150. These one or more users may include, for example, a "manager" or a "planner" handling supply chain planning and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, supply chain master planning, plan adjustment after supply chain disruptions, order placement, automated warehouse operations (including removing items from and placing items in inventory), robotic production machinery (including building or production of items), and/or one or more related tasks within supply chain network 100.

One or more supply chain entities 150 may represent one or more suppliers 152, manufacturers 154, distribution centers 156, and retailers 158 in one or more supply chain networks 100, including one or more enterprises. One or more suppliers 152 may be any suitable entity that offers to sell or otherwise provides one or more items or components to one or more manufacturers 154. One or more suppliers 152 may, for example, receive an item from a first supply chain entity 150 in supply chain network 100 and provide the item to another supply chain entity 150. Items may comprise, for example, components, materials, products, parts, supplies, or other items, that may be used to produce products. In addition, or as an alternative, an item may comprise a supply or resource that is used to manufacture the item but does not become a part of the item. One or more suppliers 152 may comprise automated distribution systems 153 that automatically transport items to one or more manufacturers 154 based, at least in part, on a supply chain plan having fair-shared items or resources, a material or capacity reallocation, current and projected inventory levels, and/or one or more additional factors described herein.

Manufacturer 154 may be any suitable entity that manufactures at least one product. Manufacturer 154 may use one or more items during the manufacturing process to produce any manufactured, fabricated, assembled, or otherwise processed item, material, component, good or product. In one embodiment, a product represents an item ready to be supplied to, for example, another supply chain entity 150, such as supplier 152, an item that needs further processing, or any other item. Manufacturer 154 may, for example, produce and sell a product to supplier 152, another manufacturer 154, distribution center 156, retailer 158, a customer, or any other suitable person or an entity. Manufacturers 154 may comprise automated robotic production machinery 155 that produce products based, at least in part, on a supply chain plan having fair-shared items or resources, a material or capacity reallocation, current and projected inventory levels, and/or one or more additional factors described herein.

One or more distribution centers 156 may be any suitable entity that offers to sell or otherwise distributes at least one product to one or more retailers 158 and/or customers. Distribution centers 156 may, for example, receive a product from a first supply chain entity 150 in supply chain network 100 and store and transport the product for a second supply chain entity 150. Such distribution centers 156 may comprise automated warehousing systems 157 that automatically transport products to one or more retailers 158 or customers and/or automatically remove an item from, or place an item into, inventory based, at least in part, on a supply chain plan having fair-shared items or resources, a material or capacity reallocation, current and projected inventory levels, and/or one or more additional factors described herein.

One or more retailers 158 may be any suitable entity that obtains one or more products to sell to one or more customers. In addition, one or more retailers 158 may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers 158 based on computer-generated instructions or automatically by machinery to place products in a desired location.

Although one or more suppliers 152, manufacturers 154, distribution centers 156, and retailers 158 are shown and described as separate and distinct entities, the same entity may simultaneously act as any one or more suppliers 152, manufacturers 154, distribution centers 156, and retailers 158. For example, one or more supply chain entities 150 acting as manufacturer 154 could produce a product, and the same entity could act as supplier 152 to supply a product to another supply chain entity 150. Although one example of supply chain network 100 is shown and described, embodiments contemplate any configuration of supply chain network 100, without departing from the scope of the present disclosure.

In one embodiment, supply chain planner 110 may be coupled with network 170 using communication link 180, which may be any wireline, wireless, or other link suitable to support data communication between supply chain planner 110 and network 170 during operation of supply chain network 100. Inventory system 120 may be coupled with network 170 using communication link 182, which may be any wireline, wireless, or other link suitable to support data communication between inventory system 120 and network 170 during operation of supply chain network 100. Transportation network 130 may be coupled with network 170 using communication link 184, which may be any wireline, wireless, or other link suitable to support data communication between transportation network 130 and network 170 during operation of supply chain network 100. One or more imaging devices 140 are coupled with network 170 using communication link 186, which may be any wireline, wireless, or other link suitable to support data communication between one or more imaging devices 140 and network 170 during operation of distributed supply chain network 100. One or more supply chain entities 150 may be coupled with network 170 using communication link 188, which may be any wireline, wireless, or other link suitable to support data communication between one or more supply chain entities 150 and network 170 during operation of supply chain network 100. Computer 160 may be coupled with network 170 using communication link 190, which may be any wireline, wireless, or other link suitable to support data communication between a computer and network 170 during operation of supply chain network 100. Although communication links 180-190 are shown as generally coupling supply chain planner 110, inventory system 120, transportation network 130, one or more imaging devices 140, one or more supply chain entities 150, and computer 160 to network 170, each of supply chain planner 110, inventory system 120, transportation network 130, one or more imaging devices 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling supply chain planner 110, inventory system 120, transportation network 130, one or more imaging devices 140, one or more supply chain entities 150, and computer 160. For example, data may be maintained locally or externally of supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using network 170 or in any other appropriate manner. For example, data may be maintained in a cloud database at one or more locations external to supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communication networks and other components.

In accordance with the principles of embodiments described herein, supply chain planner 110 may reallocate inventory of one or more items among demands or orders of one or more supply chain entities 150. In addition, one or more computers 160 associated with supply chain network 100 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on current inventory, production levels, and/or one or more other factors described herein. For example, the methods described herein may include computers 160 receiving product data 220 (FIG. 2) from automated machinery having at least one sensor and the product data 220 corresponding to an item detected by the automated machinery. The received product data 220 may include an image of the item, an identifier, as described above, and/or other data associated with the item, including, for example, dimensions, texture, estimated weight, and the like.

According to embodiments, the methods may further include computers 160 looking up received product data 220 in a database system associated with supply chain planner 110 to identify the item corresponding to the product data 220 received from automated machinery. Based on the identification of the item, computers 160 may also identify (or alternatively generate) a first mapping in the database system, where the first mapping is associated with the current location of the identified item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to the automated machinery based, at least in part, on one or more differences between the first mapping and the second mapping such as, for example, to locate items to add to or remove from an inventory of or shipment for one or more supply chain entities 150. In addition, or as an alternative, supply chain planner 110 monitors one or more supply chain constraints of one or more items at one or more supply chain entities 150 and adjusts the orders and/or inventory of one or more supply chain entities 150 at least partially based on one or more supply chain constraints.

Figure 2:
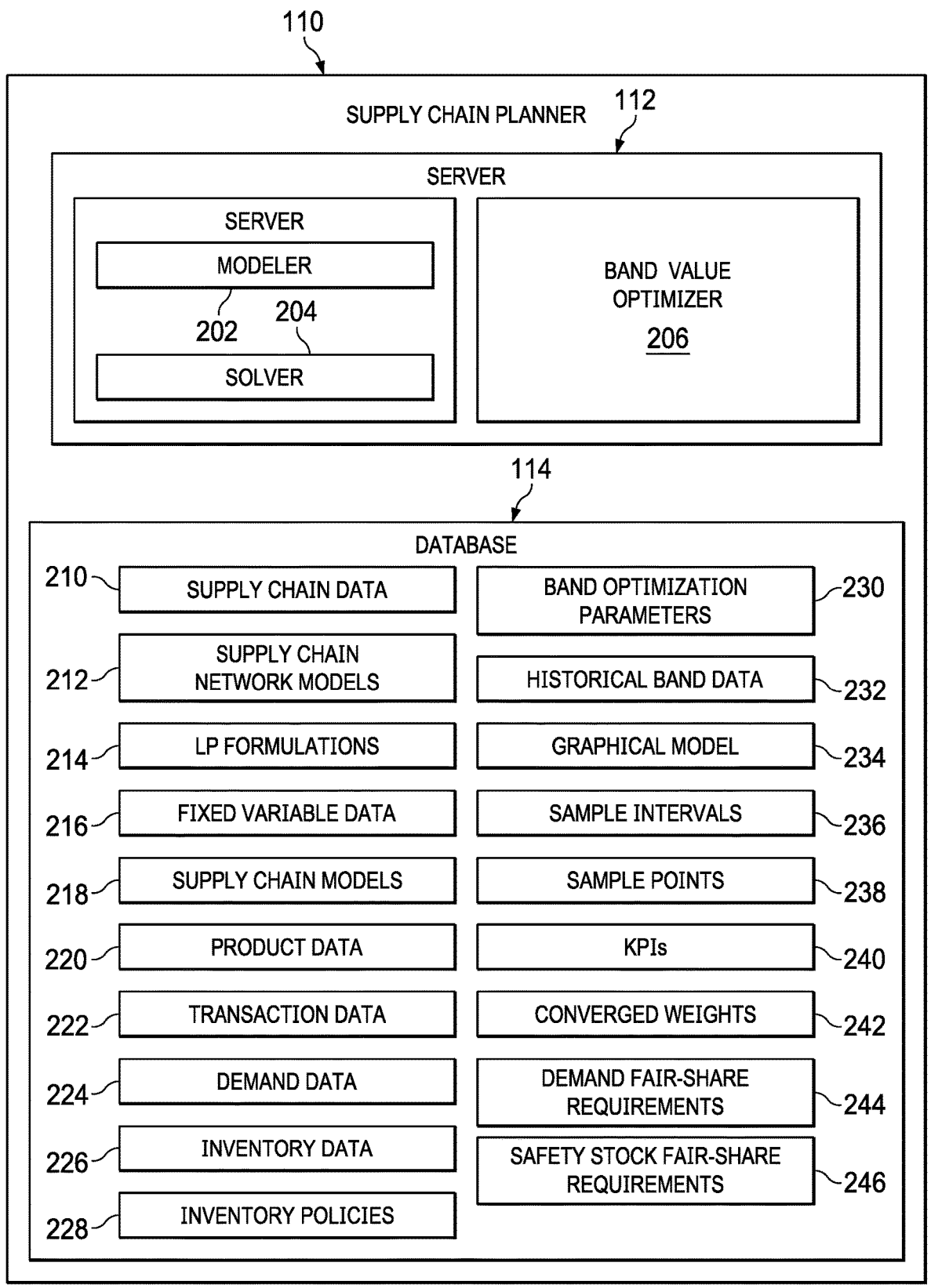
FIG. 2 illustrates the supply chain planner of FIG. 1 in greater detail, in accordance with an embodiment.

FIG. 2 illustrates supply chain planner 110 of FIG. 1 in greater detail, in accordance with an embodiment. As discussed above, supply chain planner 110 comprises server 112 and database 114. Although supply chain planner 110 is shown as comprising a single server 112 and a single database 114, embodiments contemplate any suitable number of servers 112 or databases 114 internal to or externally coupled with supply chain planner 110.

Server 112 of supply chain planner 110 may comprise modeler 202, solver 204, and band value optimizer 206. Although server 112 is shown and described as comprising a single modeler 202, a single solver 204, and a single band value optimizer 206, embodiments contemplate any suitable number or combination of these located at one or more locations, local to, or remote from supply chain planner 110, such as on multiple servers or computers at any location in supply chain network 100.

Modeler 202 of server 112 models one or more supply chain planning problems of supply chain network 100. According to embodiments, modeler 202 of server 112 models a single- or multi-period supply chain planning problem representing all or part of supply chain network 100. Modeler 202 identifies resources, operations, buffers, and pathways of supply chain data 210 (FIG. 2) and maps supply chain network 100 as supply chain network models 212 (FIG. 2). In addition, or as an alternative, modeler 202 maps optional resources and material as primary and alternate pathways.

According to embodiments, solver 204 of supply chain planner 110 solves a supply chain planning problem as an LPP comprising three components: objectives, constraints, and bounds. According to embodiments, solver 204 comprises one or more optimization, heuristic, or mathematical solvers that generates a solution to the supply chain planning problem. In one embodiment, solver 204 comprises one or more supply chain planning solvers (such as, for example, an LP solver, a MAP solver, a Deep Tree solver, and the like), constructs LP matrices representing the static structure and dynamic properties of supply chain network 100, and generates a solution, plan, cost, or other output.

As disclosed above, when the available supply is insufficient to meet demands, safety stock, or other requirements, solver 204 uses hierarchical objectives in one or more layers to represent the number and values of fair-share bands to share the limited supply in a fairer manner based on one or more business objectives. Supply chain planner 110 plans for fair-share demand by defining demand fair-share bands for a demand layer (i.e., a group of demands that will share the supply). By way of further explanation only and not by way of limitation, an example of demand fair-share bands is provided having three bands with a different weight at each band. Continuing with this example, demand fair-share bands is 20-50-100 for a first demand layer (e.g., 'Layer1'). According to embodiments, solver 204 generates an LPP wherein demand fair-share bands are formulated as a hierarchy of optimization objectives. Continuing with the provided example of 20-50-100, solver 204 of supply chain planner 110 generates the following hierarchy of optimization objectives:

Obj1 to meet up to 20% quantity of each demand in Layer1;

Obj2 to meet up to 50% quantity of each demand in Layer1; and

Obj3 to meet up to 100% quantity of each demand in Layer1.

Solving these objectives in the given sequence (i.e., Obj1→Obj2→Obj3) ensures that the limited supply is fair-shared across multiple demands by first trying to meet 20% of the quantity of each demand when solving the LPP for the first objective, followed by trying to meet 50% of each demand during the solve of the second objective, and finally, trying to meet 100% of the quantity of each demand when solving for the third objective.

According to an embodiment, band value optimizer 206 calculates the mathematically-derived optimal fair share band values for each layer which generate a supply chain plan that fair-shares the limited resource or item among the various demands. According to embodiments, band value optimizer 206 employs a search and sampling approach, wherein, for a fixed number of bands, the band weights follow a Multivariate Gaussian distribution, and the search space (direction) of the next better sample is guided by a non-linear KPI Band value optimizer 206 updates the LPP using the samples and calculates a KPI using the LP solution. In one embodiment, band value optimizer 206 uses a non-linear KPI based, at least in part, on the expected demand and short quantities. After each iteration, band value optimizer 206 updates the mean and the covariance based on a sampling method. Band value optimizer 206 reduces the runtime to determine the fair-shared supply chain plan by computing fair-share bands that are better and more quickly calculated than a trial-and-error approach by eliminating unessential additional bands (and accordingly reducing the number of objectives to solve) and identifying the number and weights of bands that are sufficient to generate a fair-shared solution without checking a large quantity of trial guesses.

Database 114 of supply chain planner 110 comprises, for example, supply chain data 210, supply chain network models 212, LP formulations 214, fixed variable data 216, supply chain models 218, product data 220, transaction data 222, demand data 224, inventory data 226, inventory policies 228, band optimization parameters 230, historical band data 232, graphical model 234, sample intervals 236, sample points 238, Key Process Indicators (KPIs) 240, converged weights 242, demand fair-share requirements 244, and safety stock fair-share requirements 246. Although database 114 is shown and described as comprising supply chain data 210, supply chain network models 212, LP formulations 214, fixed variable data 216, supply chain models 218, product data 220, transaction data 222, demand data 224, inventory data 226, inventory policies 228, band optimization parameters 230, historical band data 232, graphical model 234, sample intervals 236, sample points 238, Key Process Indicators (KPIs) 240, converged weights 242, demand fair-share requirements 244, and safety stock fair-share requirements 246, embodiments contemplate any suitable number or combination of these, located at one or more locations, local to, or remote from, supply chain planner 110 according to particular needs.

As an example only and not by way of limitation, database 114 stores supply chain data 230, which comprises any data of one or more supply chain entities 150 including, for example, decision variables, business constraints, goals, and objectives of one or more supply chain entities 150. According to some embodiments, supply chain data 210 comprises hierarchical objectives specified by, for example, business rules, master planning requirements, scheduling constraints, and discrete constraints, including, for example, sequence dependent setup times, lot-sizing, storage, shelf life, and the like.

Supply chain network models 212 represent the flow of materials through one or more supply chain entities 150 of supply chain network 100. In one embodiment, supply chain network models 212 comprise a network of nodes and edges. The material storage and/or transition units are modelled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Each edge may represent the flow, transportation, or assembly of materials (such as items or resources) between the nodes. A planning horizon may be broken down into elementary time-units, such as, for example, time-buckets, or, simply, buckets. The edge between nodes for different buffers or operations may denote processing of material and the edge between nodes for the same buffer or operation (e.g. an edge between a buffer node in one bucket and the same buffer node in a different bucket) may indicate inventory carried forward. Although supply chain network models 212 are described as comprising a network of nodes and edges, embodiments contemplate supply chain network models 212 comprising any suitable model that represents one or more components of supply chain network 100, according to particular needs.

In addition, supply chain network models 212 may represent both the supply chain static data and the supply chain dynamic data. The material buffers, resource buffers, and operation nodes of supply chain network models 212 represent the supply chain static structure, which is stored as the supply chain static data. Changes to the supply chain static structure represents, for example, the addition or removal of one or more supply chain entities 150 (such as, for example, adding or removing the one or more manufacturers 154), supply chains of different customers, various configurations of one or more supply chains, and other like structural information. The supply chain dynamic data comprises one or more resource, material, operation, flow-balance, or capacity constraints, such as, for example, lead times, yield rates, inventory levels, safety stock, demand dates, and the like. Flow-balance constraints for most, if not every buffer in every bucket, model the material movement in supply chain network 100. According to some embodiments, supply chain network models 212 represent the supply chain dynamic data as values next to the buffers and operations.

LP formulations 214 comprise one or more mathematical formulations representing one or more LP supply chain planning problems. Modeler 202 generates LP formulations 214 of supply chain planning problems, such as, for example, one or more single- or multi-objective LP supply chain planning problems. According to some embodiments, LP formulations 214 comprise mathematical objective functions that represent business objectives, such as, for example, minimizing the quantity of unmet demand, minimizing usage of alternate resources (e.g. maximizing usage of primary resources), planning items as just-in-time (JIT) as possible (e.g. minimizing the amount of carried-over items), and the like. LP formulations 214 additionally comprise mathematical constraints representing limitations to capacity, materials, lead times, and the like, as well as minimum and maximum values for decision variables representing lower and upper bounds. By way of example only and not of limitation, the lower and upper bounds for the capacity of a machine may be set at zero hours and ten hours, respectively. In this example, zero hours comprises the lower bound (because a machine cannot be used for a negative period of time), and ten hours represents a maximum number of hours the machine may be used in a day.

A hierarchical multi-objective LP supply chain planning problem has higher objectives (having a higher priority) and lower objectives (having a lower priority). When solving the hierarchical multi-objective LP supply chain planning problem, solver 204 prioritizes solving for higher objectives before lower objectives. To preserve the optimality of the higher objectives when solving for one or more lower objectives, solver 204 calculates a reduced cost to determine whether one or more decision variables should be fixed at their upper or lower bounds (which may be referred to as variable fixing). Fixed variable data 216 comprises the identity and values of one or more fixed variables.

Supply chain models 218 of database 114 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 218 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to different supply chain models 218.

Product data 220 of database 114 comprises one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 220 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Transaction data 222 of database 114 may comprise, for example, any data relating to past sales, purchase data, promotions, events, or the like of one or more supply chain entities 150. In addition, transaction data 222 is represented by any suitable combination of values and dimensions, aggregated or un-aggregated, such as, for example, sales per week, sales per week per location, sales per day, sales per day per season, or the like.

Demand data 224 may cover a time interval such as, for example, by the minute, hour, daily, weekly, monthly, quarterly, yearly, or any suitable time interval, including substantially in real time. According to embodiments, demand data 224 may include historical demand data or projected demand forecasts for one or more retail locations, customers, regions, or the like of one or more supply chain entities 150. Demand data 224 may be segmented according to product attributes, customers, regions, or the like.

Inventory data 226 of database 114 may comprise any data relating to current or projected inventory quantities or states, order rules, or the like. For example, inventory data 226 may comprise the current level of inventory for each item at one or more stocking locations across supply chain network 100. In addition, inventory data 226 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 226 in database 114, which may be used by supply chain planner 110 to place orders, set inventory levels at one or more stocking points, initiate manufacturing of one or more items (or components of one or more items), or the like, in response to, and based at least in part on, a supply chain plan, a visualization of supply chain planning problems, analytics, or other output of supply chain planner 110. In addition, or in the alternative, inventory data 226 may be updated by receiving current item quantities, mappings, or locations from inventory system 120, transportation network 130, one or more imaging devices 140, and/or one or more supply chain entities 150.

Inventory policies 228 of database 114 may comprise any suitable inventory policy describing the reorder point and target quantity, or other inventory policy parameters that set rules for supply chain planner 110 to manage and reorder inventory. Inventory policies 228 may be based on target service level, demand, cost, fill rate, or the like. According to embodiments, inventory policies 228 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although, a particular target service level and percentage is described; embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicate to one or more supply chain entities 150 to send, move, or receive inventory to replace the depleted inventory.

Figure 3:
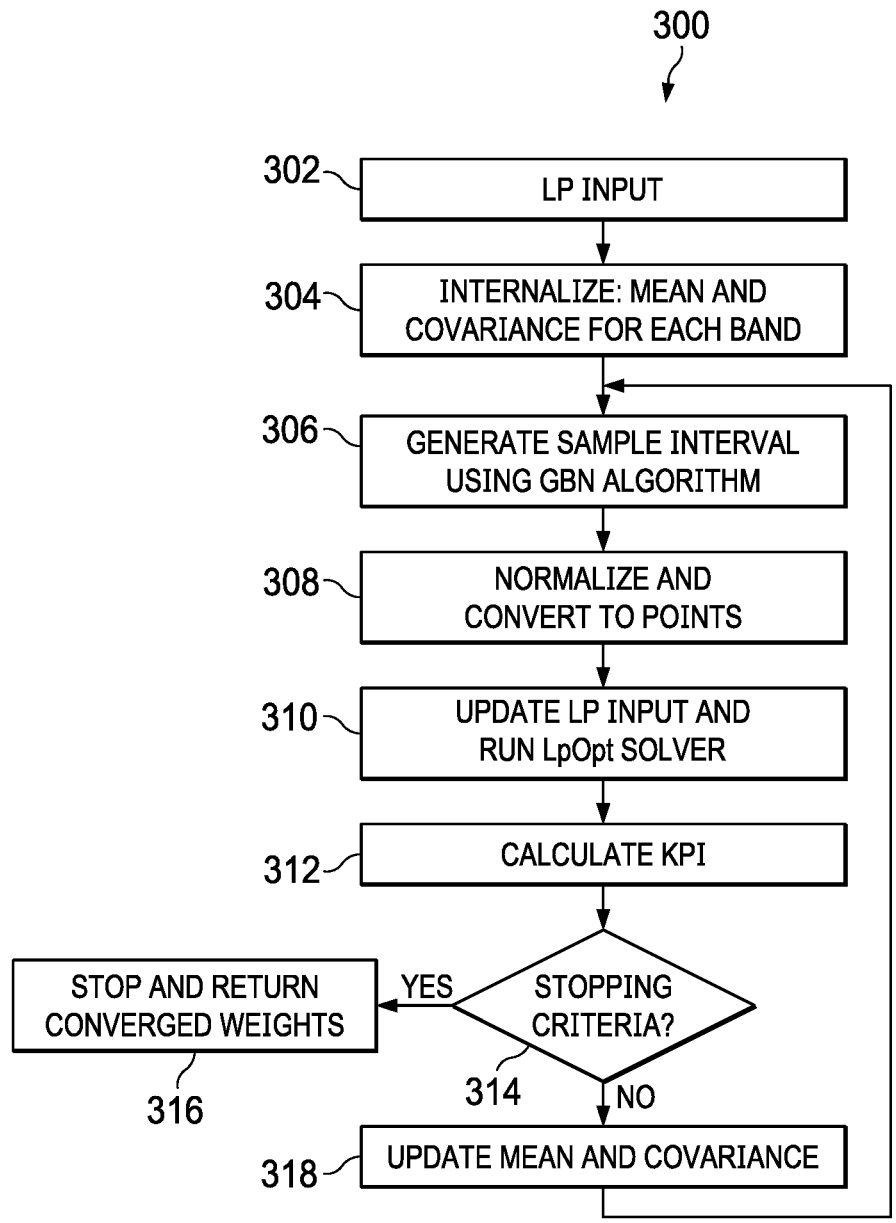
FIG. 3 illustrates a method of computing fair share band values, in accordance with an embodiment.

Band optimization parameters 230 comprise initial parameters used as input by band value optimizer 206 as well as one or more calculated or updated parameters generated during method 300 (FIG. 3). Embodiments contemplate user-selected band optimization parameters 230 that modify band optimization according to a particular use case, user preference, or according to particular needs. By way of example only and not by way of limitation, an initial set of band optimization parameters 230 comprise the initial mean and the initial covariance of a multivariate Gaussian, the quantity of bands to evaluate (band quantity or number of bands), as described in further detail below.

Historical band data 232 may comprise prior calculations or stored data of the prior calculations of the fair-share band values and/or a previously used or preferred band quantity at one or more layers. In one embodiment, historical band data 232 is used to calculate the initial values for the mean.

As described in further detail below, band value optimizer 206 employs a search and sampling approach, which is mathematically robust using graphical model 234 that draws samples intervals 236 at each iteration using a conditional Gaussian with Gibbs sampling. Graphical model 234 comprises a Bayesian network model of the input variable of interest (which is assumed to have the structure of a Gaussian random variable) which provides for Gibbs sampling. Gibbs sampling provides for a particularly fast generation of samples. According to an embodiment, band value optimizer 206 updates the mean and covariance based on new sample intervals 236, as disclosed below.

Sample points 238 comprise an ordered and normalized input to solver 204 based on sample intervals 236. In one embodiment, band value optimizer 206 converts sample intervals 236 to samples points 238 by summing the bands in the order of their index, normalizing the weights such that the maximum value is equal to 100, and ordering the weights in increasing order, as described in further detail below.

Band value optimizer 206 assesses one or more KPIs 240 for sample points 238 to evaluate the quality of the fair-share bands. According to an embodiment, one or more KPIs 240 are one or more of: a sum of absolute error, a mean absolute error, a KL divergence, and a Root Mean Square Error (RMSE). Although particular KPIs are described, embodiments contemplate any suitable KPI for evaluating the sample points 238, according to particular needs.

In one embodiment, band value optimizer 206 calls solver 204 to solve the LP problem and generate an LP solution. Based on this result, band value optimizer 206 computes KPIs 240, and, based at least in part on the computed KPIs 240, band value optimizer 206 determines whether to update the mean and covariance.

When convergence on KPIs 240 is achieved, band value optimizer 206 returns the converged mean and covariance estimates as optimal band weights 242 and may calculate the optimal band values for fair-sharing of demand, safety stock, and the like.

Demand fair-share requirements 244 are one or more business objectives that require the available supply to be distributed across different demands in a fair-shared manner such that various demands get an equal (or almost equal) proportion of the supply.

Safety stock fair-share requirements 246 are business objectives that require the available supply to be fairly shared across different SKUs so that SKUs gets an equal (or almost equal) proportion of the safety stock when the supply chain problem has limited supply. In one embodiment, supply chain planner 110 plans for fair-share safety stock by defining safety-stock fair-share bands for a demand layer (i.e., a group of demands), which are formulated as a hierarchy of optimization objectives that distribute a limited supply to various SKUs at a first level for the first objective, followed by increasingly greater levels at each subsequent objective.

Safety-stock requirements 246 may be either quantity-based or coverage-based. A quantity-based safety-stock requirement is a safety stock based on a unit quantity. A coverage-based safety stock requirement is an amount of safety stock that covers a percentage or multiplier of the forecasted demand. By way of example only and not by way of limitation, examples of quantity-based and coverage-based safety stock requirements are given for an example, SKU1. In this example, SKU1 represents Item1 at Plant1 (i.e., an item at a location is termed a SKU). An example of a quantity-based safety stock requirement for SKU1 would be a requirement to maintain a minimum stock of 100 units per day of Item1 at Plant1. An example of a coverage-based safety stock requirement for SKU1 would be a minimum stock, on each day, of a quantity of Item1 at Plant1 equal to the sum of the next 5 days' demand. Although particular examples of quantity-based and coverage-based safety stock requirements are described, embodiments contemplate any type of safety-stock requirement having any quantity or coverage for any number of days, according to particular needs.

FIG. 3 illustrates method 300 of computing the value of fair share bands, according to an embodiment. Method 300 proceeds by one or more activities, which although described in a particular order may be performed in one or more permutations, according to particular needs.

At activity 302, band value optimizer 206 receives an input to the LPP. According to an embodiment, the LP input comprises an LP demand planning problem having a limited available supply and a business objective that requires that the limited supply be fair shared among one or more demands. Although method 300 is described in connection with calculating demand fair-share band weights during LP planning to improve a plan quality by more equally sharing a limited supply among various demands, embodiments contemplate other suitable fair-share requirements (e.g., safety stock fair-share requirements), other suitable heuristics in LP (e.g., campaign planning weights), finding fair-share bands in the presence of multiple optimization goals and constraints, and the like. As disclosed above, solver 204 may comprise a campaign planning heuristic that requires weights as input parameters. Similar to the calculation of the fair-share band weights described in further detail below, embodiments of band value optimizer 206 automatically calculate campaign planning weights using band optimization method 300.

At activity 304, supply chain planner 110, initializes the mean and covariance, for each band. According to one embodiment, band value optimizer 206 initializes band optimization parameters 230. Initial band optimization parameters 230 may comprise: the initial mean, $\mu_0$, and initial covariance (sigma), $\Sigma_0$ of a multivariate Gaussian and d, the number (i.e. quantity) of bands. As shown above, the method begins by setting the mean to the initial mean and the sigma to the initial sigma ($\mu=\mu_0$, $\Sigma=\Sigma_0$). According to one embodiment, band value optimizer 206 checks historical band data 232 to calculate initial value for the mean. When historical band data 232 is not available band value optimizer 206 initializes the mean values to be equally separated. The sigma values are initialized as a scaled down factor of the mean. As disclosed above, band value optimizer 206 initializes band optimization parameters 230 for the initial mean and sigma. According to embodiments, band value optimizer 206 initializes the mean values as an equidistant set of values (e. g., for three bands the mean values may comprise 33, 66, 100). When initializing the sigma, band value optimizer 206 may scale down the mean values with a predetermined factor. Continuing with the three-band example, band value optimizer 206 may calculate the sigma values for the three-band example using a scale down factor. In this example, the scale down factor is selected as 1.4, and the initial sigma values are calculated by dividing each of the means by the scale down factor (e.g., 33/1.4, 66/1.4, 100/1.4).

Continuing to activity 306, band value optimizer 206 generates sample intervals 238 using a Gaussian Bayesian Network (GBN). When generating sample intervals 238 having a dimensionality, d, using Gibbs sampling and the GBN, such as, for example, a vector X, then each of the components are conditional on Gaussian components, such that, even when focusing on a part of a conditional component, that part of the component will also be Gaussian (i.e., $P(X_a|X_b) \sim N(\mu_{a|b}, \Sigma_{a|b})$). Here, the vector X is modeled as a Gaussian having both unknown and observed components (represented by indices 'a' and 'b', respectively) and the corresponding properties of a multivariate normal distribution (e.g., ($\mu$, $\Sigma$) are the mean and the covariance of X (i.e., $X \sim N(\mu, \Sigma)$), and wherein for the unknown and observed components, the mean and covariance may be represented by Equations 1 and 2:

$$\mu_{a|b} = \mu_{a|b} - \Lambda_{aa}^{-1} * \Lambda_{ab} * (X_b - \mu_b) \quad (1)$$

$$\Sigma_{a|b} = \Lambda_{aa}^{-1} \quad (2)$$

Within each iteration, the unobserved components are dependent on the observed components (bands), and band value optimizer 206 computes KPIs 240 using the observed sample. For an observed component, $P(X_a) \sim N(\mu'_a, \Sigma'_a)$, the mean and sigma are given by Equations 3 and 4:

$$\mu'_a = \mu_a \quad (3)$$

$$\Sigma'_a = \Sigma_a \quad (4)$$

As a guiding mechanism, a non-linear KPI comprises a function of the expected demand and short quantities. After updating the mean and sigma, the main function may iteratively repeat until one or more stopping criteria are detected, as described in further detail below. If convergence on KPI 240 is achieved, band value optimizer 206 returns the converged mean and covariance estimates as optimal band weights 242 and may calculate the optimal band values for fair-sharing of demand, safety stock, and the like. Assuming the covariance is represented by Equation 5:

$$\sum = \begin{bmatrix} \sum_{aa} & \sum_{ab} \\ \sum_{ba} & \sum_{bb} \end{bmatrix} \quad (5)$$

then, the precision matrix, $\Lambda$, is the inverse of the covariance (i.e., $\Lambda = \Sigma^{-1}$) and, for the unknown and observed components, may be represented by Equation 6:

$$\Lambda = \begin{bmatrix} \Lambda_{aa} & \Lambda_{ab} \\ \Lambda_{ba} & \Lambda_{bb} \end{bmatrix} \quad (6)$$

Band value optimizer 206 draws a quantity of samples, d, using Gibbs sampling from the Gaussian Bayesian Network, according to an embodiment. According to embodiments, band value optimizer 206 sets the initial mean and sigma, as disclosed above, and generates the initial d-dimensional component $x_0$ of the interval sample wherein $x_0 = x_1^0$, $x_2^0 \ldots x_d^0$. When drawing a value for next component, band value optimizer 206 maintains the increasing order of each interval of the sample, wherein each newly drawn point is greater than the previously observed points.

$$x_0 = x_1^0 x_2^0 \ldots x_d^0$$

$$x_1^i = N(\mu_1, \Sigma_1)$$

$$x_2^i = N(\mu_{2|1}, \Sigma_{2|1})$$

$$x_d^i = N(\mu_{d|1,2,\ldots,d-1}, \Sigma_{d|1,2,\ldots,d-1})$$

When $x^i$ improves KPI, band value optimizer 206 updates the sigma and covariance using $x^i$. When KPI values are converging, and value optimizer 206 increases i by 1 (i=i+1), and generates, $x^i$, $\mu$, $\Sigma$.

By way of further explanation only and not by way of limitation, band value optimizer 206 generates an example sample interval 402 using Gibbs sampling of a GBN as described in connection with FIG. 4.

Figure 4:
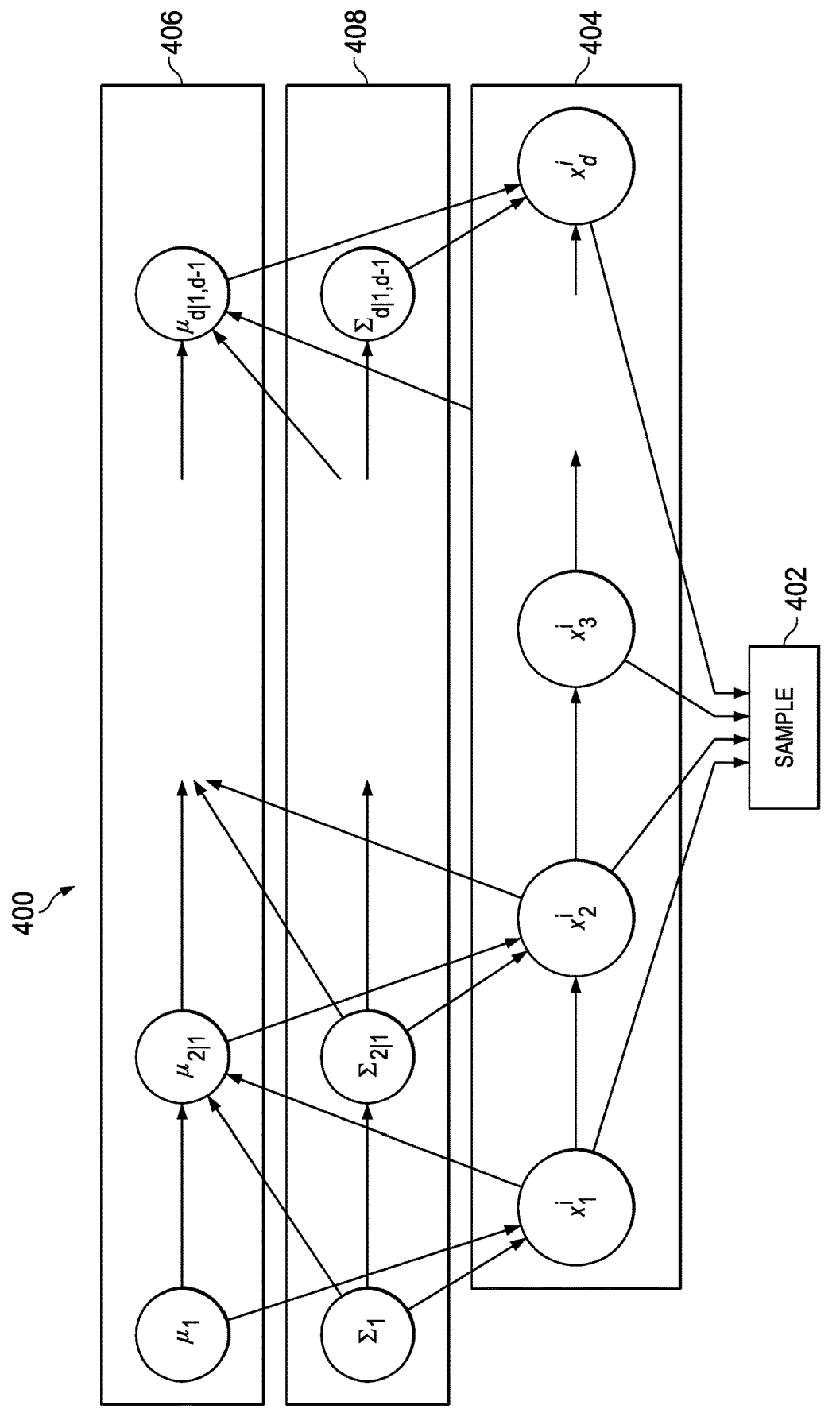
FIG. 4 illustrates a Gaussian Bayesian Network of a sample interval, in accordance with an embodiment.

FIG. 4 illustrates Gaussian Bayesian Network 400 of example sample interval 402, according to an embodiment. Example sample interval 402 of Gaussian Bayesian Network 400 comprises components 404, $x_1^i$, $x_2^i \ldots x_d^i$, comprising the first through $d^{th}$ components, which form a network of functions of means 608 $\mu_1$, $\mu_{2|1} \ldots \mu_{d|1,d-i}$ and sigmas 606 $\Sigma_1$, $\Sigma_{2|1} \ldots \Sigma_{d|1,d-i}$ of the other components, wherein the interval sample is a Gaussian with a normalized distribution and each of the components is also a Gaussian with a normalized distribution. Each dimension together with all the previous observed dimensions follow Gaussian distribution, and, accordingly, band value optimizer 206 generates a Gaussian when sampling the current dimension because band value optimizer 206 conditions the current sample on all the previously observed dimensions, which are Gaussian.

By way of example only and not by way of limitation, band value optimizer 206 generates sample interval 402 by drawing the first component, $C_0$, using a Gaussian distribution, drawing a next component, $C_1|C_0$, from the first component, and continuing to draw further components from all of the previous components, $C_i|C_0, C_1 \ldots C_{i-1}$, until the last component is drawn, wherein i is the number of bands for the selected sample. According to embodiments, band value optimizer 206 iteratively draws a new sample for all components for the given band size, i. As described in further detail below, band value optimizer 206 repetitively draws a new sample in each iteration until one or more stopping criteria (e.g., reaching the last component) is detected. Once all components have been sampled (i.e., band value optimizer 206 reaches the last component) or one or more other stopping criteria is detected, band value optimizer 206 generates the sample interval.

At activity 308, band value optimizer 206 normalizes and converts the sample intervals to points. According to an embodiment, solver 204 requires the input for the bands to be in increasing order and normalized so that the maximum value is equal to 100. In one embodiment, band value optimizer 206 converts the samples to points by summing the bands in the order of their index and normalizing such that the maximum value is equal to 100 and ordered in numerically increasing order. By way of further explanation only and not by way of limitation, an example interval sample may comprise weights of 20, 60, 80. Continuing with this example, band value optimizer 206 orders the sums of the weights in increasing order (i.e., 20, 20+60, 20+60+80) and then normalizes the sums (i.e., 20/160, 80/160, 160/160)*100=12.5, 50, 100), wherein 12.5, 50, and 100 comprises the sample points 238 which are provided as input to solver 204. Although converting sample intervals 236 to sample points 238 are described having a particular number of bands and band values, embodiments contemplate band value optimizer 206 converting any number of bands and band weights into any number of values for the LP input, according to particular needs.

Based on the normalized sample points 238, band value optimizer 206 updates the LP input, and solver 204 solves the updated LPP for the updated LP input, at activity 310. As described above, band value optimizer 206 updates the LP input based on the normalized sample points 238 and calculates the quantity of limited supply assigned to the demand, an amount of limited safety stock assigned to each SKU, or other shared quantity.

Based on the output generated from solving the LPP, band value optimizer 206 calculates KPI values at activity 312. According to an embodiment, band value optimizer 206 selects the KPI such that, when the LPP fairly shares a quantity of a limited supply (e.g., a limited available supply is fair shared for a demand), the value of the KPI is at a minimum. As described in further detail below, band value optimizer 206 uses the calculated KPI values to check whether the KPI is increasing, decreasing, or not changing. Accordingly, each time band value optimizer 206 calculates the KPI, band value optimizer 206 checks for an improved KPI. Based on the previous KPI and the current KPI, band value optimizer 206 adjusts the mean and variance, as described in further detail below.

According to embodiments, the KPI may comprise a sum of absolute error, a mean absolute error, a KL divergence, a Root Mean Square Error (RMSE), or the like. In one embodiment, the KPI was calculated as the RMSE divided by the effective number of bands. Calculating the KPI values using the RMSE is an appropriate fit for parameter tuning because it captures the proportionate distribution of the short quantities across all expected demands together with the number of bands. Supply chain planner 110 calculates the RMSE according to Equation 7:

$$\text{RMSE} = \sqrt{\sum_i^{bands}(\text{Qty}_{exp} - \text{Qty}_{short})^2} \quad (7)$$

wherein, $\text{Qty}_{short}$ is the short demand quantity that supply chain planner 110 obtains from solving the LPP; and $\text{Qty}_{exp}$ is expected demands that the LPP is trying to meet and is calculated by multiplying each demand by the ratio of the short demand quantity to the total demand quantity. By way of further explanation only and not by way of limitation an example in now given with reference to TABLE 1.

TABLE 1

| | Demand | Short | Expected |
|---|---|---|---|
| Demand 1 | 700 | 300 | 62% of 700 = 434 |
| Demand 2 | 1400 | 770 | 62% of 1400 = 868 |
| Demand 3 | 1400 | 1000 | 62% of 1400 = 868 |
| Demand 4 | 700 | 535 | 62% of 700 = 434 |
| Total | 4200 | 2605 | 2605/4200 = 62% Ratio = Total short quantity/ total demand quantity |

TABLE 1 shows an example of an LPP having four demands: 700, 1400, 1400, and 700. Continuing this example, the short quantity is calculated by solving the LPP as: 300, 770, 1000, and 535. Summing the demand and short quantities, the total demand quantity is 4200 and the total short quantity is 2605. In this example, the total demand cannot be satisfied with the current supply. To calculate the expected quantity, the ratio of the shortage (total short quantity) is divided by the total demand quantity (e.g., 2605/4200=62%). If each of the demands is fair-shared, then each of the demands should be shorted equally, meaning each demand should receive 62% of the available supply (total short quantity). The expected demand quantity for each demand should therefore be the demand multiplied by 62% (e.g., 434, 868, 868, and 434, as shown in TABLE 1 above). This expected demand quantity is the most equal way to fair-share the available supply. Band value optimizer 206 evaluates fair sharing using the RMSE by finding fair-share solutions that minimize the RMSE value, which measures the amount of deviation between the expected demand and the shortage. To find the best fair-share bands, band value optimizer 206 evaluates the RMSE for samples representing various combinations of band quantities and band values, searching for those that produce the lowest value of the RMSE. Although the RMSE value is described as a KPI used to evaluate the samples, embodiments contemplate using other suitable KPIs to find the band quantity and values for the fair-share solution of the LPP, as disclosed above.

Continuing further with the example of TABLE 1, band value optimizer 206 may calculate the amount of deviation between the expected demand and the shortage using the RMSE. To optimize the KPI value, band value optimizer 206 tries to minimize the RMSE value. Although the KPI is shown and described as comprising the RMSE, embodiments contemplate other suitable KPIs, as disclosed above.

In addition or as an alternative, embodiments contemplate adjusting the number of bands by calculating an effective number of bands. According to an embodiment, band value optimizer 206 determines the effective number of bands by assessing the difference between values of consecutive bands. For example, band value optimizer 206 may calculate the effective number of bands as the number of bands which has at least a minimum threshold gap between two consecutive bands. In one embodiment, band value optimizer 206 calculates the threshold gap (t %) according to Equation 8:

$$\frac{RMSE}{\|d^2\|} \geq t\% \quad (8)$$

where Root Mean Square Error, RMSE, is calculated as disclosed above, and the distance, d, between three-dimensional band intervals (b1, b2, b3) are calculated according to the following expression: $\sqrt{(b_2-b_1)^2+(b_3-b_2)^2}$. By way of further explanation only and not by way of limitation, an example of calculating the effective number of bands is given in connection with TABLE 2.

TABLE 2

| Example | Bands | Total Bands | Effective Number of Bands |
|---|---|---|---|
| Example 1 | [20, 21, 50, 100] | 4 | 3 |
| Example 2 | [10, 21, 50, 100] | 4 | 4 |

TABLE 2 shows the effective number of bands calculated for two examples, each having four bands. Example 1 has four band values: [20, 21, 50, 100]. Notably, the band values of the first two bands are numerically close (i.e., 20 and 21). To ensure sufficient separation between consecutive band values, band value optimizer 206 uses a predetermined threshold percentage to make sure that the gap between the two consecutive band values is more that the threshold percentage. When any two values are less than the threshold percentage then it will reduce the band number by one. Continuing with Example 1 of Table 2, band value optimizer 206 calculates the RMSE and the distance of Equation 8 to determine the threshold percentage gap. Based on the threshold percentage gap, band value optimizer 206 determines that the band values of 20 and 21 are too close to provide a meaningful difference when fair-sharing demand and, the effective number of bands is three. Because the difference between 20 and 21 is so small compared with the other band values, performing fair-share on a supply using [20, 21, 50, 100] would generate nearly the same result as three bands comprising [20, 50, 100]. When formulating the LPP, the generating two hierarchical objectives with a value band so close to the subsequent value band will likely not lead to an efficient solution of the LPP. Using Equation 8, band value optimizer 206 may calculate that the effective number of bands is three even when the four band values were calculated.

At activity 314, supply chain planner 110 checks for one or more stopping criteria. According to embodiments, the stopping criteria may comprise one or more of reaching a predetermined number of iterations and a predetermined threshold value for sigma. In one embodiment, for example, the stopping criteria may comprise meeting or exceeding one hundred iterations or the current sigma value is less than or equal to 0.5% of the mean value. In this example, band value optimizer 206 will end method 300 when it detects that the number of iterations has reached one hundred or when a sigma value is less than 0.5% of a mean value. When one or more stopping criteria are detected at activity 314, band value optimizer 206 ends the iterative optimization and returns the converged weights at activity 316. According to embodiments, band value optimizer 206 generates µ, the band interval weights which minimize one or more KPIs 240 for a given dimensionality, d, and Σ, the interval covariance matrix.

When one or more stopping criteria are not detected at activity 314, band value optimizer 206 continues to activity 318, where band value optimizer 206 updates the mean and the covariance for the GBN. When a sample drives the KPI in the desired direction (e.g., lower, for a minimization problem), then mean and sigma are updated to reflect the next sample generation in the same direction. In one embodiment, band value optimizer 206 calculates alpha, a measure of change between a previous KPI and a new KPI, to update the parameters of the distribution according to Equation 9:

$$\text{Alpha: } ((prev\_kpi - new\_kpi)/prev\_kpi) \quad (9)$$

wherein prev_kpi is the KPI calculated for the previous sample, and new_kpi is the KPI calculated for the current sample. According to embodiments, a greater value of alpha indicates the parameters are moving toward a result having a better band value.

Band value optimizer 206 may normalize alpha to the range (0,1), so that the updated parameters do not move toward a direction that worsens the resulting band values. In one embodiment, band value optimizer 206 normalizes alpha using a Rectified Linear Unit operation with clipping (Clipped Relu) according to the function of Equation 10:

$$\text{Clipped Relu}:=f(x)=\min(1,\max(0,x)) \quad (10)$$

wherein the Clipped Relu reduces the variance of the alpha to improve selection of the new mean by ensuring the new mean is in the direction of improved band weights. Band value optimizer 206 updates the mean according to Equation 11:

$$new\_mean=(alpha)*(old\_mean)+(1-alpha)*(new\_observation) \quad (11)$$

wherein the updated mean, new_mean, is calculated from the clipped and normalized value of alpha, the previous value of the mean, old_mean, and the new_observaion, comprising the current sample interval generated from the components $x_1^i, x_2^i \ldots x_d^i$ used to generate the band values sent to the LPP to calculate new_KPI, the KPI calculated for the current sample, as disclosed above.

Band value optimizer 206 calculates the updated covariance according to Equation 12:

$$new\_sigma=((alpha)*(old\_sigma)+((1-alpha)/1.1)*(Sample*Sample^T)) \quad (12)$$

wherein new_sigma is the updated sigma calculated from alpha, the previous sigma, old_sigma, a shrinking factor of 1.1, used to shrink the old sigma, to direct band value optimizer 206 to find faster convergence while drawing a sample in the relatively shrunken search space for the next iteration. Although shrinking factor is shown and described as 1.1, embodiments contemplate other suitable shrinking factors according to particular needs.

After generating the new mean and covariance, method 300 returns to activity 306 to generate additional interval samples, checking the KPIs to determine how far the expected solution is from the fair-shared solution, and iteratively continuing until when one or more stopping criteria are met and band value optimizer 206 generates the values (weights) for the fair shared bands.

Dataset 1:

By way of further explanation of the method of computing optimal band values, an example is now given in connection with a first dataset, Dataset 1.

TABLE 3

| | |
|---|---|
| Number of Bands | 3, 2 |
| Initial Mean | [[25, 50, 100], [50, 100]] |
| Initial Sigma | [[17.86, 35.71, 71.42], [35.71, 71.42]] |
| Iteration | 50 |
| KPI Criteria | RMSE |
| Best KPI | 26.3 |
| Band Values | [[22, 65, 100], [23, 100]] |
| Convergence | 5 |

TABLE 3 illustrates the initial values and results of optimization for an example based on a first dataset, Dataset 1. Dataset 1 comprises three bands in a first layer and two bands in a second layer (i.e., (3, 2)=three bands in the first layer and two bands in the second layer). Accordingly, three values are selected for the initial mean and sigma values in the first layer, and two values are selected for the initial mean and sigma in the second layer. Continuing with the example of TABLE 3, the initial mean selected is [25, 50,100] for the first layer, and [50,100] for the initial mean of the second layer. Similarly, the initial sigma selected is [17.86, 35.71, 35.71, 71.42] for the first layer, and the initial sigma is [35.71, 71.42] for the second layer. In this embodiment, band value optimizer 206 initializes the mean with equidistant values and initializes the sigma as a scaled down factor of the mean (mean divided by 1.4), as disclosed above. The iteration is fifty, which indicates the number of samples needed for convergence. The KPI criteria was selected as RMSE (which is calculated as disclosed above), the highest calculated KPI value (Best KPI) was 26.3, and the optimal band weights were calculated as [[22, 65, 100], [23,100]], with a convergence at approximately 5 iterations.

FIG. 5 illustrates chart 500 showing convergence of calculated KPI values 502 for each iteration number 504 of band weight optimization for five bands in two layers, in accordance with an embodiment Chart 500 comprises a y-axis indicating the calculated KPI value 502 and x-axis indicating the number of iterations 504 for convergence plot 506. Referring to TABLE 3, band value optimizer 206 calculates the optimal band values using method 300 and beginning with the initial values for the mean and sigma. Calculating the KPI as the RMSE, method 300 continued for 5 iterations before the calculated KPI value 502 converged at a minimal value of 26.3. To show the improvement to the fair share of demands, the quantity of supply distributed to each of the demands according to the calculated band values is compared with the demand assigned according to the initial band values, in TABLE 4.

TABLE 4

| Item | Date | Demand | Beginning | | Convergence | |
|------|------|--------|-----|-------|-----|-------|
| | | | Met | Short | Met | Short |
| item_B1-0 | 2013 Mar. 14 | 100 | 50 | 50 | 62 | 38 |
| item_B1-0 | 2013 Mar. 9 | 100 | 100 | 0 | 62 | 38 |
| item_B1-0 | 2013 Mar. 18 | 100 | 50 | 50 | 62 | 38 |
| item_B2-1 | 2013 Mar. 14 | 200 | 100 | 100 | 124 | 76 |
| item_B2-1 | 2013 Mar. 9 | 200 | 200 | 0 | 166 | 34 |
| item_B2-1 | 2013 Mar. 18 | 200 | 100 | 100 | 124 | 76 |

TABLE 4 shows the met and shorted demands, before and after band optimization, for two items at two different dates. The quantity of supply assigned to each demand prior to calculating the fair-share bands is shown by the beginning met value, whereas the shortage of supply at each demand is given by the beginning short value. In the example illustrated by TABLE 4, the solution of the LPP that is calculated prior to determining fair-share bands does not fully meet any demand and also creates a wide disparity in the percentage of the supply that is distributed to each demand. In this example, the met and shorted demands are given for two items: "item_B1-0" and "item_B2-1" at three dates (i.e., the ninth, fourteenth, and eighteenth of March 2013). In this example, the demands are 100, 100, 100, 200, 200, and 200 units. For example, referring the sixth demand Item_B2-1 on 18 Mar. 2013, although the demand is for 200 units, the initial solution to the LP problem assigned only 100 units and shorted the demand by 100 units. Similar to the 18 March demand for Item_B2-1, the 14 March demand and the 9 March demand also comprise 200 units. Comparing this initial met and initial shortage of the demand for Item_B2-1 on 18 March with the demands of 14 March and 9 March for Item_B2-1 indicate that the available supply was not fair shared among each demand. Instead, the demands of 14 March and 18 March are both shorted by 100 units and met for 100 units, while the demand of 9 March is fully met (200 units) with no shortage (0 units). After calculating the bands and weights by band value optimizer 206, solver 204 re-solves the LPP using the fair-share bands, and the solution shares the limited supply more fairly as shown by comparing the ratios of shorted demand to the expected quantity of demand, as shown by the three met quantities of demands at convergence (i.e., met at convergence (124, 166, and 124)), which is more fairly shared than the supply assignment prior to band optimization. To solve the LPP using the calculated band weights, solver 204 will include in the hierarchy of objectives at least two objectives for each of the two layers. By way of example only and not by way of limitation, demand fair-share bands may be defined as 22-65-100 for a first demand layer (e.g. 'Layer1') and 23-100 for a second demand layer (e.g. 'Layer2'). To solve the LPP for these demand fair-share bands, solver 204 creates the following hierarchy of optimization objectives:

Obj1 to meet up to 22% quantity of each demand in Layer1;

Obj2 to meet up to 65% quantity of each demand in Layer1; and

Obj3 to meet up to 100% quantity of each demand in Layer1.

Solving these objectives in the given sequence (i.e., Obj1 prior to Obj2 and Obj2 prior to Obj3) ensures that the limited supply is distributed across multiple demands in a fair-shared manner by first trying to meet 22% of each demand quantity, followed by trying to meet 65% of each demand, and finally trying to meet 100% of each demand.

Solver 204 creates the following hierarchy of optimization objectives for the second layer:

Obj1 to meet up to 23% quantity of each demand in Layer2; and

Obj2 to meet up to 100% quantity of each demand in Layer2.

Solving these objectives in the given sequence (i.e., Obj1 prior to Obj2) ensures that the limited supply is distributed across multiple demands in a fair-shared manner by first trying to meet 23% of the quantity of each demand, followed by trying to meet 100% of each demand.

Although solver 204 is described as generating particular objectives and layers, embodiments contemplate solver 204 generating any number of objectives and layers representing any number of bands and band weights, according to particular needs.

Dataset 2:

By way of additional explanation only, and not by way of limitation, an example of computing the optimal band values is now given for a second dataset, Dataset 2.

TABLE 6

| Bands (Qty.) | 3, 2 |
| Initial Mean | [[25, 50, 100], [50, 100]] |
| Initial Sigma | [[17.86, 35.71, 71.42], [35.71, 71.42]] |
| Iteration | 50 |
| KPI Criteria | RMSE |
| Best KPI | 78 |
| Band Values | [[6, 34, 100], [66, 100]] |
| Convergence | 60 |

TABLE 6 illustrates the initial values and results of band optimization for an example based on a second dataset, Dataset 2. Dataset 2 comprises three bands in a first layer and two bands in a second layer as indicated by the band quantities (3,2).

Initial values for the mean and sigma are calculated for each band number in each layer. The iteration for evaluating the samples is 50, and the KPI is selected as RMSE. Using these initial values, band value optimizer 206 determines the best KPI for Dataset 2 is 78 for band values of [[6,34,100], [66,100]] which is obtained by convergence at the sixtieth iteration.

FIG. 6 illustrates chart 600 of convergence plot 602 having calculated KPI 502 at each iteration 504 of band weight optimization, in accordance with an embodiment. Convergence plot 602 shows the example of TABLE 6 converges by the sixtieth iteration to a KPI 502 of seventy-eight, as disclosed above.

TABLE 7

| Item | Date | Demand | Beginning | | Convergence | |
| --- | --- | --- | --- | --- | --- | --- |
| | | | Met | Short | Met | Short |
| Item1_A-0 | 14 Mar. 2013 | 700 | 400 | 300 | 400 | 300 |
| Item1_A-0 | 12 Mar. 2013 | 1400 | 655 | 745 | 504 | 896 |
| Item1_B-1 | 14 Mar. 2013 | 1400 | 400 | 1000 | 439 | 961 |
| Item1_B-1 | 12 Mar. 2013 | 700 | 140 | 560 | 252 | 448 |

TABLE 7 shows the demands for two items at two different dates, according to an embodiment. In this example, the demands are 700 and 1400 on March 12 and March 14 for Item1_A-0 and 1400 and 700 on March 12 and March 14 for Item1_B-1 Solver 204 calculates an initial distribution of supply to the demands prior to calculating fair-share bands. The quantity of supply assigned to each demand prior to calculating the fair-share bands is shown by the beginning met value, whereas the shortage of supply at each demand is given by the beginning short value. In the example illustrated by TABLE 7, the solution of the LPP that is calculated prior to determining fair-share bands does not fully meet any demands, and the supply is not fairly shared among the demands. In this example, the supply assigned by the solution is not proportional to each demand's percentage of the total demand. Similar to above, the disparity in the percentage of each demand that is met by the available supply indicates that a better solution to more fairly share the supply is possible. After band optimization, solver 204 solves the LPP using objective functions that model the quantity and weights of the fair-share bands calculated by band value optimizer 206. The quantity of demand that is met and shorted when solving the LPP with the fair-share bands is given by the convergence met value and the convergence short value, respectively. By comparing the ratio of the quantity of met demand to the quantity of expected demand for each of the demands at convergence, the distribution of the supply is more fairly shared when solving the LPP with fair-share bands than when calculated prior to band optimization.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of efficiently determining fair-share bands of a supply chain planning problem modeled as a multi-objective hierarchical linear programming problem, comprising:
one or more imaging devices comprising one or more electronic devices configured to receive imaging information from one or more sensors, the one or more imaging devices configured to generate a mapping of one or more items to determine a current location of the one or more items at one or more supply chain entities;
a computer, comprising a processor and memory, the computer configured to:
receive supply chain input data for the supply chain planning problem;
model the supply chain planning problem as a multi-objective hierarchal linear programming problem having a first objective and at least one additional objective, and based, at least in part, on the supply chain input data;
assign weights at each band of a fixed number of at least two bands, wherein the weights follow a multivariate Gaussian distribution;
determine a direction of improved band values from a value of a Key Process Indicator (KPI) calculated from an expected demand and short quantities, wherein the expected demand and short quantities are calculated from the multi-objective hierarchical linear programming problem using a sample generated by Gibbs sampling of a conditional Gaussian Bayesian Network;
solve each of the first objective and the at least one additional objective of the multi-objective hierarchical linear programming problem;
repeat the determine and the solve until a stopping criteria is met of a current sigma value being less than a threshold;
generate a supply chain plan based, at least in part, on a solution of the supply chain planning problem after updating the objectives based, at least in part, on the improved band values;
receive product data from automated robotic machinery comprising at least one sensor, wherein the product data corresponds to an item of the one or more items detected by the automated robotic machinery;
generate a first mapping and a second mapping of the item, the first mapping associated with a first current location of the item, and the second mapping associated with a second past location of the item;
compare the first mapping and the second mapping to determine if the first current location of the item is different from the second past location of the item;
monitor one or more supply chain constraints of the one or more items at the one or more supply chain entities and adjust a current inventory of the one or more supply chain entities by sending instructions to the automated robotic machinery according to the generated supply chain plan and based, at least in part, on the one or more supply chain constraints and one or more differences between the first mapping and the second mapping;
in response to sending the instructions to the automated robotic machinery, automatically locate items to add or remove from the current inventory of the one or more supply chain entities; and
automatically add or remove, by the automated robotic machinery, the automatically located items from the current inventory.

2. The system of claim 1, wherein the computer is further configured to:
update the mean and the covariance after each iteration based, at least in part, on new sample estimates generated by the Gaussian Bayesian Network.

3. The system of claim 1, wherein the computer is further configured to:
calculate the value of the KPI from the expected demand short quantities for one or more additional samples; and
detect when the value of the KPI converges to a particular KPI value.

4. The system of claim 1, wherein the fixed number of at least two bands comprises at least two bands in a first level and at least two bands in a second level.

5. The system of claim 1, wherein the computer is further configured to:
  select the fixed number of at least two bands by:
    calculating the RMSE and a distance for the at least two band weights to determine a threshold percentage gap; and
    when the band value weights are less than or equal to the threshold percentage gap, decrease the fixed number of at least two bands by one.

6. The system of claim 1, wherein the computer is further configured to:
  iteratively solve each of the first objective and the at least one additional objectives of the multi-objective hierarchical linear programming problem until detecting one or more of:
    a predetermined number of iterations; and
    a predetermined threshold value for sigma.

7. The system of claim 1, wherein the supply chain plan is selected from one or more of:
  a master supply chain plan;
  a production plan;
  a distribution plan; and
  a campaign plan.

8. A method of efficiently determining fair-share bands of a supply chain planning problem modeled as a multi-objective hierarchical linear programming problem, comprising:
  receiving imaging information from one or more sensors associated with one or more imaging devices comprising one or more electronic devices, the one or more imaging devices configured to generate a mapping of one or more items to determine a current location of the one or more items at one or more supply chain entities;
  receiving supply chain input data for the supply chain planning problem;
  modeling the supply chain planning problem as a multi-objective hierarchal linear programming problem having a first objective and at least one additional objective, and based, at least in part, on the supply chain input data;
  assigning weights at each band of a fixed number of at least two bands, wherein the weights follow a multi-variate Gaussian distribution;
  determining a direction of improved band values from a value of a Key Process Indicator (KPI) calculated from an expected demand and short quantities, wherein the expected demand and short quantities are calculated from the multi-objective hierarchical linear programming problem using a sample generated by Gibbs sampling of a conditional Gaussian Bayesian Network;
  solving each of the first objective and the at least one additional objective of the multi-objective hierarchical linear programming problem;
  repeating the determining and the solving until a stopping criteria is met of a current sigma value being less than a threshold;
  generating a supply chain plan based, at least in part, on a solution of the supply chain planning problem after updating the objectives based, at least in part, on the improved band values;
  receiving product data from automated robotic machinery comprising at least one sensor, wherein the product data corresponds to an item of the one or more items detected by the automated robotic machinery;
  generating a first mapping and a second mapping of the item, the first mapping associated with a first current location of the item, and the second mapping associated with a second past location of the item;
  comparing the first mapping the and second mapping to determine if the first current location of the item is different from the second past location of the item; and
  monitoring one or more supply chain constraints of the one or more items at the one or more supply chain entities and adjusting a current inventory of the one or more supply chain entities by sending instructions to the automated robotic machinery according to the generated supply chain plan and based, at least in part, on the one or more supply chain constraints and one or more differences between the first mapping and the second mapping;
  in response to sending the instructions to the automated robotic machinery, automatically locating items to add or remove from the current inventory of the one or more supply chain entities; and
  automatically adding or removing, by the automated robotic machinery, the automatically located items from the current inventory.

9. The method of claim 8, further comprising:
  updating the mean and the covariance after each iteration based, at least in part, on new sample estimates generated by the Gaussian Bayesian Network.

10. The method of claim 8, further comprising:
  calculating the value of the KPI from the expected demand short quantities for one or more additional samples; and
  detecting when the value of the KPI converges to a particular KPI value.

11. The method of claim 8, wherein the fixed number of at least two bands comprises at least two bands in a first level and at least two bands in a second level.

12. The method of claim 8, further comprising:
  selecting the fixed number of at least two bands by:
    calculating the RMSE and a distance for the at least two band weights to determine a threshold percentage gap; and
    when the band value weights are less than or equal to the threshold percentage gap, decrease the fixed number of at least two bands by one.

13. The method of claim 8, further comprising:
  iteratively solving each of the first objective and the at least one additional objectives of the multi-objective hierarchical linear programming problem until detecting one or more of:
    a predetermined number of iterations; and
    a predetermined threshold value for sigma.

14. The method of claim 8, wherein the supply chain plan is selected from one or more of:
  a master supply chain plan;
  a production plan;
  a distribution plan; and
  a campaign plan.

15. A non-transitory computer-readable medium embodied with software, the software when executed:
  receives imaging information from one or more sensors associated with one or more imaging devices comprising one or more electronic devices, the one or more imaging devices configured to generate a mapping of one or more items to determine a current location of the one or more items at one or more supply chain entities;
  receives supply chain input data for the supply chain planning problem;

models the supply chain planning problem as a multi-objective hierarchal linear programming problem having a first objective and at least one additional objective, and based, at least in part, on the supply chain input data;

assigns weights at each band of a fixed number of at least two bands, wherein the weights follow a multi-variate Gaussian distribution;

determines a direction of improved band values from a value of a Key Process Indicator (KPI) calculated from an expected demand and short quantities, wherein the expected demand and short quantities are calculated from the multi-objective hierarchical linear programming problem using a sample generated by Gibbs sampling of a conditional Gaussian Bayesian Network;

solves each of the first objective and the at least one additional objective of the multi-objective hierarchical linear programming problem;

repeats the determines and the solves until a stopping criteria is met of a current sigma value being less than a threshold;

generates a supply chain plan based, at least in part, on a solution of the supply chain planning problem after updating the objectives based, at least in part, on the improved band values;

receives product data from automated robotic machinery comprising at least one sensor, wherein the product data corresponds to an item of the one or more items detected by the automated robotic machinery;

generates a first mapping and a second mapping of the item, the first mapping associated with a first current location of the item, and the second mapping associated with a second past location of the item;

compares the first mapping and the second mapping to determine if the first current location of the item is different from the second past location of the item; and monitors one or more supply chain constraints of the one or more items at the one or more supply chain entities and adjusts a current inventory of the one or more supply chain entities by sending instructions to the automated robotic machinery according to the generated supply chain plan and based, at least in part, on the one or more supply chain constraints and one or more differences between the first mapping and the second mapping;

in response to sending the instructions to the automated robotic machinery, automatically locates items to add or remove from the current inventory of the one or more supply chain entities; and automatically adds or removes, by the automated robotic machinery, the automatically located items from the current inventory.

16. The non-transitory computer-readable medium of claim 15, wherein the software when executed further:
updates the mean and the covariance after each iteration based, at least in part, on new sample estimates generated by the Gaussian Bayesian Network.

17. The non-transitory computer-readable medium of claim 15, wherein the software when executed further:
calculates the value of the KPI from the expected demand short quantities for one or more additional samples; and
detects when the value of the KPI converges to a particular KPI value.

18. The non-transitory computer-readable medium of claim 15, wherein the fixed number of at least two bands comprises at least two bands in a first level and at least two bands in a second level.

19. The non-transitory computer-readable medium of claim 15, wherein the software when executed further:
selects the fixed number of at least two bands by:
calculating the RMSE and a distance for the at least two band weights to determine a threshold percentage gap; and
when the band value weights are less than or equal to the threshold percentage gap, decrease the fixed number of at least two bands by one.

20. The non-transitory computer-readable medium of claim 15, wherein the software when executed further:
iteratively solves each of the first objective and the at least one additional objectives of the multi-objective hierarchical linear programming problem until detecting one or more of:
a predetermined number of iterations; and
a predetermined threshold value for sigma.

* * * * *